Sept. 7, 1937.   K. SCHWARTZWALDER ET AL   2,092,027
METHOD FOR MAKING CERAMIC BODIES
Filed June 27, 1935

Inventors
Alex S. Rulka &
Karl Schwartzwalder
By Blackmore, Spencer & Flint
Attorneys Patented Sept. 7, 1937

2,092,027

UNITED STATES PATENT OFFICE 2,092,027

METHOD FOR MAKING CERAMIC BODIES

Karl Schwartzwalder and Alex S. Rulka, Flint, Mich., assignors to General Motors Corporation, Detroit, Mich., a corporation of Delaware Application June 27, 1935, Serial No. 28,631

10 Claims. (Cl. 25—156)

This invention has to do with method and apparatus for forming ceramic bodies out of non-plastic compositions. The invention is particularly directed to the manufacture of insulators for spark plugs.

It has heretofore been common practice to employ a considerable proportion of clay in the mix, the clay serving as a plasticizer making the batch workable for forming to shape. The addition of clay in conventional spark plug insulators has been in the neighborhood of 30 to 50%, and the presence of clay and particularly its alkali content has had a detrimental effect on the fired body. It has also been the practice to employ flux along with the clay and non-plastic material to reduce the firing temperature to within the limits of the kilns ordinarily available. These fluxes have likewise had a detrimental effect on the bodies, particularly on the electrical resistance at high temperature, this property being known as the Te value.

While it has been known that various non-plastic materials possess properties which should make them desirable for use in spark plug insulators, the difficulty has been to find a commercial method of manufacture in which little or no clay would be employed. Among the methods previously used to form bodies out of non-plastics, perhaps the most successful has been by casting in porous molds a slip of finely ground non-plastic and water, with or without the addition of a small proportion of acid to increase moldability or castibility and dry strength. In a modification of this process pressure is applied to the slip increasing the flow of water into the mold pores but the pressure is necessarily of low order inasmuch as it is dissipated through the pores of the mold. While satisfactory bodies can be produced by these methods, they are essentially cumbersome and costly, requiring a large number of molds which soon become worthless due to clogging and breakage, and furthermore the formed body is fragile resulting in considerable loss in handling.

Another method known as "dry pressing" consists in pressing the ground and moistened refractory in suitable molds, but with this method laminations frequently appear in the final body producing weakness which may destroy its usefulness. The pressures heretofore employed in using this method have been relatively low, on the order of a few hundred pounds per square inch.

According to the present invention, non-plastic materials are ground to a high degree of fineness, and made into a slip. In the case of certain materials it will be found desirable to add a small proportion of acid to the slip to produce gel colloids and/or chemical compounds that increase the cohesiveness of the particles. The slip is then preferably treated to bring the water content within the desired limits and is then ready to be formed. This may be done in a single operation, using heavy pressures, but preferably is accomplished as follows: The wetted material, preferably in shredded form, is supplied to a preform mold, where it is given a preliminary shape under relatively light pressure on the order of 500 lbs. per square inch. The preform is then inserted in the finishing press where it is subjected to very heavy pressure, e. g., 16,000 lbs. per square inch and upwards. The cooperating dies of the press form a substantially closed mold, the clearances between the parts, however, permitting escape of fluid. The fluid in the mix serves to equalize the pressure throughout the body during the pressing operation producing bodies of substantially uniform density free of laminations. The blank is now in finished form ready for the drying and firing operation which may be accomplished in the usual manner.

By the use of this method, characterized by the employment of very heavy pressures on materials containing a relatively high moisture content, it is possible to form out of non-plastic materials bodies possessing sufficient strength to permit handling, and upon sintering these bodies insulators of superior quality are obtained.

The apparatus used in the process is characterized by simplicity of design. In the preform press means is provided to perforate the blank to provide for the usual center wire, and in the final pressing operation a threaded mandrel is inserted in the preform for the same purpose, the mandrel being subsequently withdrawn, leaving a perforated blank.

In the drawing Fig. 1 is a diagrammatic sectional view showing the method of making the preforms.

The invention can be best understood by the following description of one specific application of it.

In making spark plug insulators of substantially pure aluminum oxide the alumina was dry ground to a high degree of fineness. Thus in one application of the invention it was ground in a steel lined mill with steel balls to a fineness to pass a 325 mesh screen. The finely ground alumina was then treated with a relatively weak hydrochloric acid solution tending to remove the iron produced by disintegration of the balls and mill during the grinding operation. The acid at the same time converts some of the alumina particles into gel colloids, and also forms a proportion of aluminum chloride, both of the substances acting somewhat as a bond in subsequent operations. The excess acid is preferably removed from the slip by washing with water.

The acid treated slip is then dehydrated as by passing it through a filter press, until it contains on the order of from 14 to 20% water, or if preferred it is dried out completely and the desired amount of water is added. The resulting material is then shredded as by rubbing through a screen, and is now ready for the making of the preformed blanks.

Figure 1:
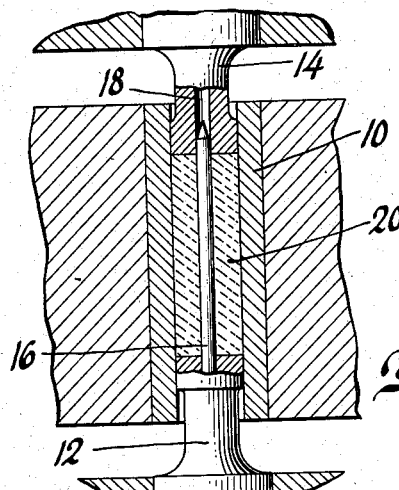

Figure 1 illustrates diagrammatically the essential parts of the press in which the preforms are made. 10 indicates a stationary bushing while 12 and 14 indicate opposed rams working in an aperture in the bushing. The ram 12 carries pin 16 which is adapted to be forced through the material in the mold and enter the aperture 18 in the ram 14. Figure 1 shows the parts in the positions they assume at the end of the preforming operation. Pressure used in preforming is on the order of 500 lbs. per square inch. Thereafter the rams are withdrawn and the preform is removed from the mold. If desired one of the rams may be employed as an ejector to remove the piece from the mold.

Figure 3:
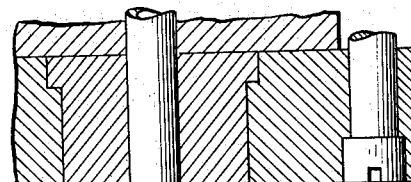
Figure 3 is a view corresponding to Figure 2 showing the final stage of the pressing operation.
Figure 3:
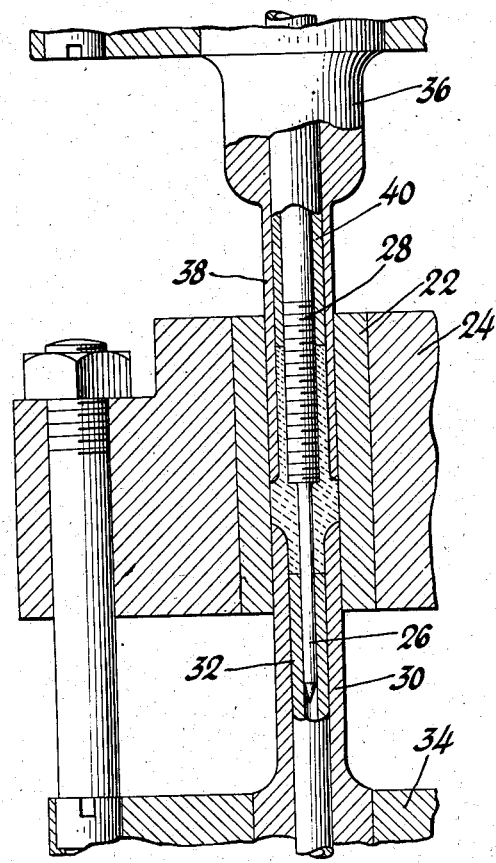
Figure 2:
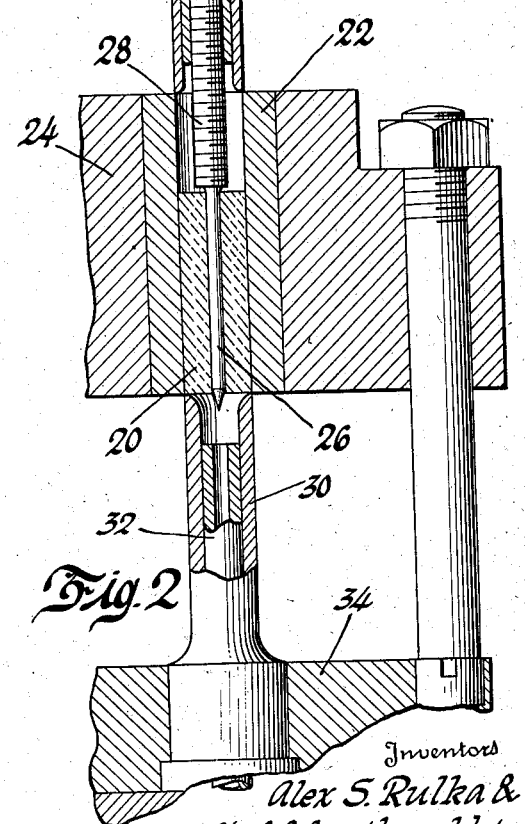
Figure 2 is a diagrammatic sectional view showing the preform inserted in the press ready for final forming.

The preform indicated at 20 is next inserted in stationary die 22 in the press shown in Figures 2 and 3. Die 22 is preferably mounted in the stationary carrier 24. It will be noted that the preform surrounds the center wire 26, one end of which is threaded at 28 so as to form a correspondingly shaped bore in the finished piece. 30 and 32 indicate portions of the die for forming one end of the insulator, these parts being carried by the reciprocating piston 34. Piston 36 carries the corresponding die members 38 and 40, together with the center wire member 26. Die member 32 is apertured to receive the end of the center wire.

In the forming operation the pistons 34 and 36 are moved toward each other under heavy pressure on the order of from 16,000 lbs. per square inch and upwards. We have successfully employed pressures as high as 60,000 lbs. per square inch. At the end of the pressing movement the parts assume the position shown in Figure 3. The heavy pressure forces excess water out through the clearances between the parts of the die. However, this liquid has in the meantime served its purpose of evenly distributing pressure throughout the insulator body, producing uniform density throughout. The pistons are now withdrawn, the piston 36 carrying the blank clear of the die 22. By rotating the center wire member 26 it may be withdrawn from the blank leaving the latter ready for the firing operation. The insulator shape as removed from the mold is hard and dense. If desired, it may be dried to remove additional moisture.

The firing may be accomplished in the usual manner, insulators of alumina requiring temperatures on the order of Seger cone 35 to accomplish sintering and produce a dense non-porous body.

The process is susceptible of considerable modification in practice. For instance, the preforming operation could be eliminated, the material in slip form being charged directly into the final mold.

If desired the preforming operation may be omitted, the material being supplied directly to the dies of a press like that shown in Figures 2 and 3 which forms the blank at a single operation. This modification will, of course, require greater travel of the press pistons than where a partially formed blank is used.

The fineness to which the material should be ground will depend upon the particular kind used. In the course of experimental work with a considerable number of non-plastics we have found it desirable to employ material all of a grain size under approximately 43 microns, preferably comminuted material having a surface area on the order of 7,000 to 9,000 square centimeters per gram.

In the preparation of the raw material it may be desirable to add an organic binder, such as gelatin, gum arabic, gum tragacanth, flour paste, cold water paste, etc., to the slip. Such binders like the acid added to the slip, act as plasticizers, that is, they give a degree of plasticity to the mix although not enough to permit forming by plastic methods.

The preparation of the material into convenient form for filling the molds may be done in various ways.

The process is capable of application with a great variety of non-plastic compositions in the production of bodies of a great variety of shapes. It may also prove to have some advantage in the molding of bodies from plastic compositions, although present forming methods are reasonably satisfactory.

We claim:

1. The method of forming bodies out of substantially non-plastic ceramic material which consists in grinding the material, preparing a slip therefrom, and applying pressure to a portion of the slip confined in a non-porous mold consisting of movable parts having clearance between them sufficient to permit the escape of fluid but not of the non-plastic material to force out excess water and produce a coherent body of the desired shape, the fluid in the slip serving to equalize the distribution of pressure throughout the body during the pressing operation, producing a body of substantially uniform density.

2. The method of forming bodies out of substantially non-plastic ceramic material which consists in finely grinding the material, preparing a slip therefrom, applying high pressure to a portion of the slip confined in a non-porous mold consisting of movable parts having clearance between them sufficient to permit the escape of fluid but not of the non-plastic material to force out excess water and produce a coherent body of the desired shape, the fluid in the slip serving to equalize the distribution of pressure throughout the body during the pressing operation, producing a body of substantially uniform density.

3. The method of making bodies out of substantially non-plastic ceramic material which consists in finely grinding the material, preparing a slip therefrom, applying high pressure to a portion of the slip confined in a non-porous mold consisting of movable parts having clearance between them sufficient to permit the escape of fluid but not of the non-plastic material to force out excess water and produce a coherent body of the desired shape, the fluid in the slip serving to equalize the distribution of pressure throughout the body during the pressing operation, producing a body of substantially uniform density, and firing the formed body to a temperature to sinter the particles together.

4. The method of forming bodies out of substantially non-plastic ceramic material which consists in finely grinding the material, preparing a slip from the ground material and a plasticizer, applying high pressure to a portion of the slip confined in a non-porous mold consisting of movable parts having clearance between them sufficient to permit the escape of fluid but not of the non-plastic material to force out excess water and produce a coherent body of the desired shape, the fluid in the slip serving to equalize the distribution of pressure throughout the body during the pressing operation, producing a body of substantially uniform density.

5. The method of forming bodies out of ceramic material which consists in finely grinding the material, preparing a slip therefrom, applying pressure on the order of at least 16,000 lbs. per square inch to a portion of the slip confined in a non-porous mold consisting of movable parts having clearance between them sufficient to permit the escape of fluid but not of the non-plastic material to force out excess water and produce a coherent body of the desired shape, the fluid in the slip serving to equalize the distribution of pressure throughout the body during the pressing operation, producing a body of substantially uniform density.

6. The method of making bodies out of ceramic material which consists in finely grinding the material, preparing a slip therefrom, applying pressure on the order of at least 16,000 lbs. per square inch to a portion of the slip confined in a non-porous mold consisting of movable parts having clearance between them sufficient to permit the escape of fluid but not of the non-plastic material to force out excess water and produce a coherent body of the desired shape, the fluid in the slip serving to equalize the distribution of pressure throughout the body during the pressing operation, producing a body of substantially uniform density, and firing the formed body to a temperature to sinter the particles together.

7. The method of forming bodies out of substantially non-plastic ceramic material which consists in grinding the material to a fineness of at least on the order of 43 microns, preparing a slip therefrom, applying pressure on the order of at least 16,000 lbs. per square inch to a portion of the slip confined in a non-porous mold consisting of movable parts having clearance between them sufficient to permit the escape of fluid but not of the non-plastic material to force out excess water and produce a coherent body of the desired shape, the fluid in the slip serving to equalize the distribution of pressure throughout the body during the pressing operation, producing a body of substantially uniform density.

8. The method of forming bodies out of substantially non-plastic ceramic material which consists in grinding the material to a fineness of at least on the order of 43 microns, preparing a slip from the ground material and a plasticizer, applying pressure on the order of at least 16,000 lbs. per square inch to a portion of the slip confined in a non-porous mold consisting of movable parts having clearance between them sufficient to permit the escape of fluid but not of the non-plastic material to force out excess water and produce a coherent body of the desired shape, the fluid in the slip serving to equalize the distribution of pressure throughout the body during the pressing operation, producing a body of substantially uniform density.

9. The method of forming bodies of ceramic material which consists in grinding the material, preparing slip from the ground material, applying pressure to a confined portion of the slip to partially dry the same and produce a preformed blank, applying heavy pressure to the preformed blank in a non-porous mold consisting of movable parts having clearance between them sufficient to permit the escape of fluid but not of the non-plastic material to further dry the same and produce a coherent body of the desired shape, the fluid in the slip serving to equalize the distribution of pressure throughout the body during the pressing operation producing a body of substantially uniform density free from laminations.

10. The method of forming bodies of ceramic material which consists in grinding the material, preparing slip from the ground material and a suitable plasticizer, applying pressure to a confined portion of the slip to partially dry the same and produce a preformed blank, applying heavy pressure to the preformed blank in a non-porous mold consisting of movable parts having clearance between them sufficient to permit the escape of fluid but not of the non-plastic material to further dry the same and produce a coherent body of the desired shape, the fluid in the slip serving to equalize the distribution of pressure throughout the body during the pressing operation producing a body of substantially uniform density free from laminations.

KARL SCHWARTZWALDER.
ALEX S. RULKA.